United States Patent
Stehle et al.

(10) Patent No.: US 10,421,031 B2
(45) Date of Patent: Sep. 24, 2019

(54) FILTER DEVICE

(71) Applicant: RT-FILTERTECHNIK GMBH, Friedrichshafen (DE)

(72) Inventors: Gerhard Stehle, Constance (DE); Marco Bautz, Friedrichshafen (DE)

(73) Assignee: RT-FILTERTECHNIK GMBH, Friedrichshafen (DE)

(*) Notice: Subject to any disclaimer, the term of this patent is extended or adjusted under 35 U.S.C. 154(b) by 493 days.

(21) Appl. No.: 14/899,606

(22) PCT Filed: Jun. 26, 2014

(86) PCT No.: PCT/EP2014/001741
§ 371 (c)(1),
(2) Date: Dec. 18, 2015

(87) PCT Pub. No.: WO2015/007364
PCT Pub. Date: Jan. 22, 2015

(65) Prior Publication Data
US 2016/0144305 A1    May 26, 2016

(30) Foreign Application Priority Data
Jul. 16, 2013 (DE) ........................ 10 2013 011 866

(51) Int. Cl.
*B01D 35/147* (2006.01)
*B01D 29/13* (2006.01)
(Continued)

(52) U.S. Cl.
CPC ........... *B01D 35/147* (2013.01); *B01D 29/13* (2013.01); *B01D 35/027* (2013.01); *B01D 35/06* (2013.01)

(58) Field of Classification Search
CPC .... B01D 35/147; B01D 29/13; B01D 35/027; B01D 35/06
See application file for complete search history.

(56) References Cited

U.S. PATENT DOCUMENTS

| 2003/0094407 A1* | 5/2003 | de Ridder | B01D 24/08 210/120 |
| 2010/0257824 A1* | 10/2010 | Wilkendorf | B01D 29/21 55/312 |
| 2011/0036770 A1* | 2/2011 | Jokschas | B01D 29/21 210/440 |

FOREIGN PATENT DOCUMENTS

| DE | 1 951 668 | 4/1971 |
| DE | 10 2008 012 521 | 9/2009 |

(Continued)

OTHER PUBLICATIONS

International Search Report (ISR) dated Sep. 8, 2014 in International (PCT) Application No. PCT/EP2014/001741.

*Primary Examiner* — Krishnan S Menon
*Assistant Examiner* — Waqaas Ali
(74) *Attorney, Agent, or Firm* — Wenderoth, Lind & Ponack, L.L.P.

(57) ABSTRACT

A filter device has at least one filter element (17, 19) exchangeably received in a housing (9). The filter element has a filter medium (23) permeable to a flow of the fluid to be purified and has, on at least one end, an end cap (25) that, for the purpose of positioning of the filter element (17, 19) in a functional position, interacts with a fixing body (33) connected to a removable cover (11) of the housing (9). A bypass valve (51) is provided on the fixing body (33). On the fixing body (33), a wall part (57) in the functional position forms a dividing element in the housing separating the housing into a filter element chamber (65) and a bypass chamber (63) situated at the outflow side of the bypass valve (51). The bypass chamber has a protective filter (67) through which the fluid flowing out of the bypass valve (51) can flow.

10 Claims, 4 Drawing Sheets

(51) Int. Cl.
*B01D 35/027* (2006.01)
*B01D 35/06* (2006.01)

(56) References Cited

FOREIGN PATENT DOCUMENTS

| | | |
|---|---|---|
| EP | 2 363 189 | 9/2011 |
| WO | 2009/109212 | 9/2009 |

* cited by examiner

FILTER DEVICE

FIELD OF THE INVENTION

The invention relates to a filter device with at least one element that can be accommodated, preferably replaceably, in a housing. The filter element has a filter medium through which the fluid to be cleaned can flow and has an end cap on at least one end that acts together with a retaining body for positioning the filter element in an operative position. The retaining body is connected with a removable cover of the housing. A bypass valve is provided on the retaining body.

BACKGROUND OF THE INVENTION

Filter devices of this type represent the prior art. For example, WO 2009/109212 A1 discloses a device of this kind in the form of a return line filter mountable in a fluid storage tank. Such in-tank filter devices are preferably used in working devices provided with a hydraulic system, such as excavators, wheel loaders or telehoist load luggers etc., which are provided with a working hydraulic system, for example in the form of hydraulic cylinders that can be controlled and supplied by pumps. During operation, as known per se from the aforementioned document, fluid passes through the filter element from the inside forming the unfiltered side toward the outside of the filter medium forming the clean side. The cleaned fluid reaches the tank content through fluid passages in the filter housing immersed in the tank. To facilitate the replacement of a used filter element, the retaining body positioning the corresponding filter element in its operative position is connected with a removable lid and, together with it, removable from the housing during a replacement process.

SUMMARY OF THE INVENTION

An object of the invention is to provide an improved filter device of this type that is characterized by particularly favorable operational behavior.

According to the invention, this problem is basically solved by a filter device, as one essential feature of the invention, a retaining body provided with a wall part that, in the operative position, forms a partition in the housing separating the housing into a filter element chamber and a bypass chamber located on the outflow side of the bypass valve. The bypass chamber is provided with a protective filter through which the fluid flowing out of the bypass valve can flow. In the prior art, when the bypass valve is triggered, unpurified fluid reaches the outside of the filter element and passes through the fluid passages of the housing to the tank contents, bypassing the filter medium. In contrast, in the invention the fluid flowing out of the bypass valve enters the bypass chamber, which is separated from the clean side filter element chamber, and leaves the bypass chamber only after passing through the protective filter. Particularly for more heavily polluted fluids, such as hydraulic oil, which in the return to the tank are led through the filter device, this invention avoids the risk that coarse contaminants reach the tank interior when the bypass valve is triggered. The invention therefore allows for high system purity, and thus, a favorable operational behavior of the device.

Particularly advantageously, the wall part of the retaining body forming the partition is in the form of a disk that surrounds the centrally located bypass valve and that extends in a radial plane perpendicular to the axis with respect to the axis of the corresponding hollow cylindrical housing, and forms a support for the protective filter on the side of the bypass chamber. The retaining body then has a double function of not only forming the partition subdividing the filter housing and of the support for the protective filter provided in the bypass chamber.

As an added feature, the retaining body in the operative position can also be supported on the inside of the wall of the hollow cylindrical housing with its peripheral edge of its disk. The filter element is then secured via the retaining body against shear forces acting during operation.

The area of the disk adjacent to the peripheral edge can particularly advantageously form the support for the protective filter.

In especially advantageous exemplary embodiments, a receiving element for the protective filter is provided on the area of the disk forming the support.

In exemplary embodiments where the filter media of the protective filter forms a hollow cylinder concentric to the axis, a particularly advantageous arrangement can be made such that the receiving element is provided with an axially projecting annular rib at a radial distance from the peripheral edge of the disk. The outside of the rib forms a contact surface for the corresponding end edge area of the protective filter.

A bezel, which radially abuts the inside contact surface of the annular rib, may be particularly advantageously provided for receiving the corresponding end of the filter medium of the protective filter.

As a bezel, an end cap located on the protective filter may be provided. Alternatively, the bezel may be formed by a part integrally formed on the disk, in particular when acting together with the annular rib axially projecting from the disk.

The outer side of the filter medium of the protective filter may be supported on a support tube having fluid passages. The end of the support tube is received together with the corresponding end edge of the filter medium in the receiving element on the disk. Alternatively, the outer side of the protective filter in the operative position can be supported on the housing wall having fluid passages. Therefore, a support tube is associated with the protective filter is omitted.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
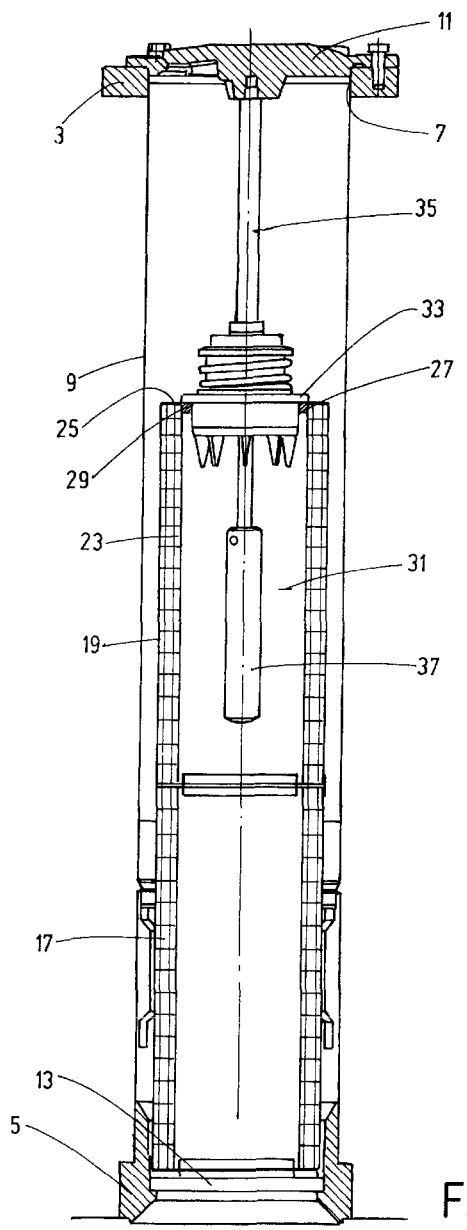
FIG. 1 is a schematically simplified, side view in section of an in-tank filter device according to the prior art.

The invention is explained below with reference to an example, in which the filter device is designed in form of a return line filter, mountable in a tank, an in-tank filter. FIG. 1 shows a filter device according to the prior art, as documented in WO 2009/109212 A1. Of the corresponding tank, particularly in the form of a tank for storing hydraulic oil, only one tank flange 3 and one tank chamber 5 each of the tank not otherwise shown, are indicated in the drawing. The tank flange 3 surrounds a tank opening 7 into which the upper open end of a filter housing 9 extends. At the opening 7, the housing 9 is closable by a removable housing lid 11. At its lower end, the hollow cylinder-shaped housing 9 is connected to the tank chamber 5, which forms an inlet channel 13 for the contaminated fluid. At a distance from the lower end, the wall of the housing 9 comprises window-shaped passage openings 15, as they are visible only in FIG. 2, for discharging the cleaned fluid. The passage openings 15 extend upward to the area of the upper end of a filter element that can be accommodated in the housing 9. The filter element is made up of a lower coarse filter element 17 and an upper fine filter element 19. The construction of the composite filter element 17, 19 and the local assignment of the passage openings 15 in this respect corresponds to the known installation filter as it is known per se from the mentioned prior art document WO 2009/109212 A1. As disclosed therein, the coarse filter element 17 and fine filter element 19 are interconnected via a connecting member 21, which is formed by an annular body forming a fluid passage.

Figure 2:
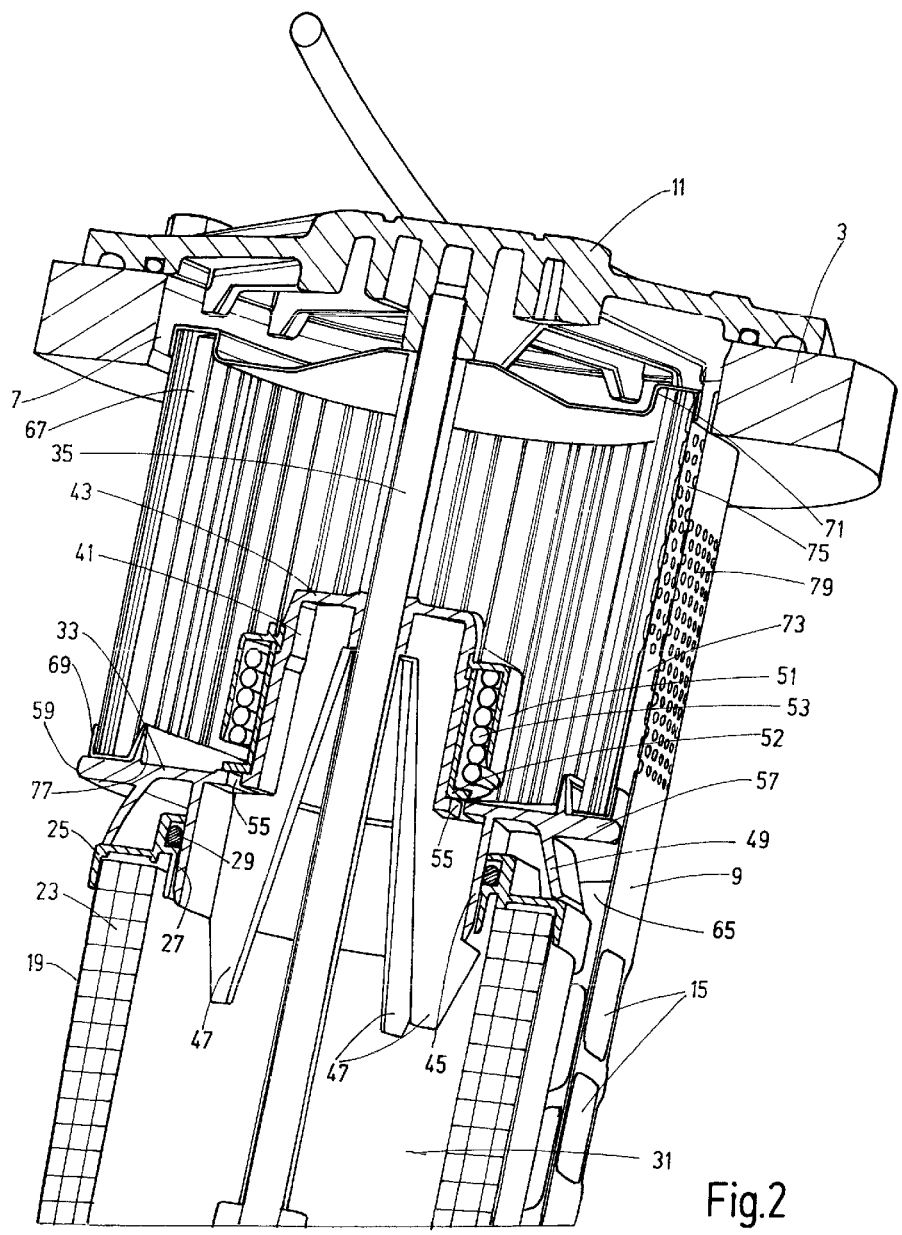
FIG. 2 is a partial perspective view in section of an upper partial area of a filter device of an exemplary embodiment of the invention on a larger scale than FIG. 1.
Figure 3:
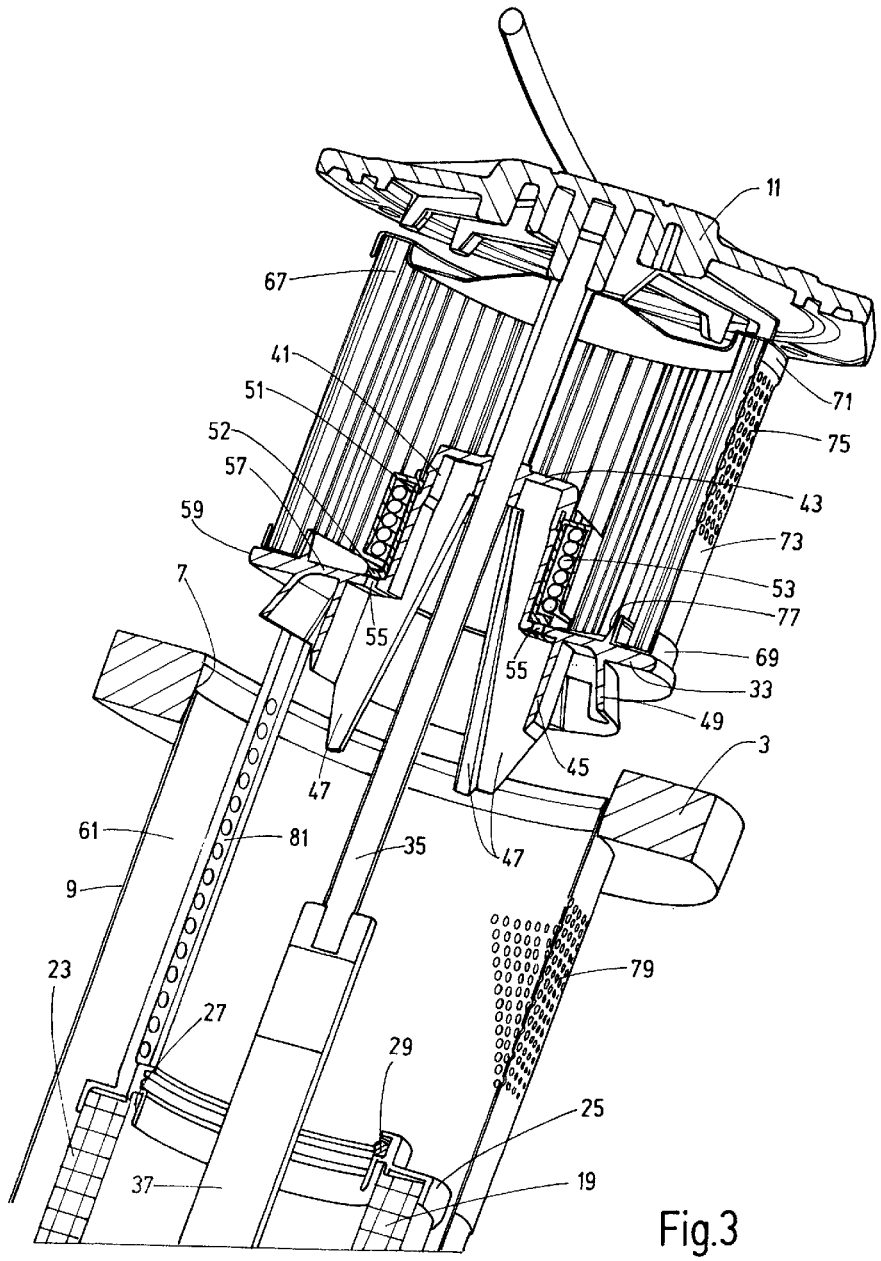
FIG. 3 is a partial perspective view in section of the filter device of FIG. 2, with the lid being shown lifted away from the filter housing.
Figure 4:
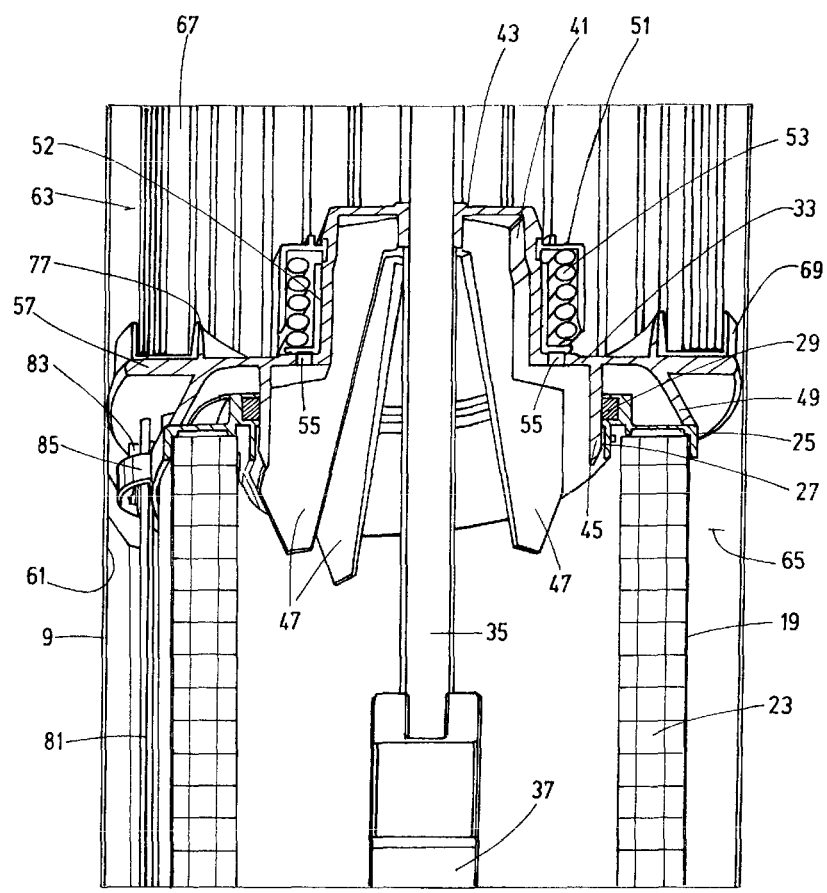
FIG. 4 is a partial side view in section of the central area corresponding to the upper end cap of the filter element in a position rotated with respect to FIGS. 2 and 3.

The upper end of the filter medium 23 of the filter element 17, 19 has an end cap 25 that, as is more clearly apparent from FIGS. 2 to 4, has a central opening 27, on which a sealing device in the form of an O-ring 29 is located. The opening 27 forms a passage to the inner filter cavity 31 of the filter element 17, 19. FIG. 1 shows the filter element 17, 19 in its operative position, as also shown in FIGS. 2 and 4. In the operative position, the filter element 17, 19 is secured by a retaining body 33, which in turn is rigidly connected to the lid 11. This connection is made via a rod-shaped support 35 extending coaxially to the axis of the cylindrical housing. The support 35 extends through the retaining body 33 and into the filter cavity 31 and, at its free end, comprises a magnetic core 37, i.e., a permanent magnet device of a type also known per se.

FIGS. 2 to 4, in which same reference numerals as in FIG. 1 are used for the same components, show more details of an exemplary embodiment of the filter device according to the invention. The retaining body 33 in the form of a molded part, preferably formed of plastic, differs from the prior art shown in FIG. 1 in that it is radially extended beyond the area of the end cap 27 of the filter element 17, 19. On the upper side facing away from the filter element 17, 19, this radial expansion forms a substantially flat disk 57, which surrounds a hollow body 41. This hollow body extends in the manner of a dome 43 coaxially to the support rod 35 axially upward and is penetrated by the support rod 35. At the bottom, the hollow body 41 forms a connecting piece 45, which extends through the opening 27 of the end cap 25 into the filter cavity 31 and is sealed by the O-ring 29 at the opening 27. The interior of the hollow body 41 including the connecting piece 45 is reinforced by fan-shapes fins 47. Radially outside of the connecting piece 45, on the underside of disk 57, the retaining body 33 forms a bell-shaped, axially protruding support body 49, which, in the operative position, abuts the upper side of the end cap 25 to form an axial securing element of the same. On the outside of the dome 43 of the retaining body 33, a bypass valve 51, for correspondingly high dynamic pressure, forms a fluid path bypassing the filter medium 23. The bypass valve 51 comprises a sleeve-shaped, movable valve body 52, which is biased by a spring 53 into a closed position, in which it closes a fluid passage 55 in the retaining body 33.

The retaining body 33 is radially expanded beyond the area of the supporting body 49 so that the upper side outside of the central region forms a flat disk 57. In the operative position, the peripheral edge of disk 57 extends with its outer periphery 59 to the inner wall 61 of the housing 9. The disk 57 then forms a support for the retaining body 33 against shear forces acting on the filter element 17, 19 during operation. At the same time, the disk 57 forms a partition that, in the housing 9, separates an upper bypass chamber 63, located between disk 57 and housing lid 11, from an element chamber 65 located below.

On the upper side facing the bypass chamber 63, the disk 57 of the retaining body 33 forms a support for supporting a bypass protective filter 67. Similar to the filter element 17, 19 located in the element chamber 65, filter 67 comprises a hollow cylindrical filter mat, which is preferably folded in a pleated manner and is enclosed by a lower end cap 69 and an upper end cap 71 on its end sides. The end caps 69, 71 also form the bezel for a support tube 73 surrounding the outside of the filter mat, having fluid passages in the form of perforations 75. With its radially inner side, the lower end cap 69 abuts an annular rib 77 that protrudes radially, concentrically at a radial distance from the disk peripheral edge 59. In place of the enclosure of the filter mat by the end cap 79, an enclosure molded onto the disk 57 itself, for example in conjunction with the annular rib 77 could also be provided for this purpose. Also, the support tube 73 of the protective filter 67 could be omitted. In this case, the filter mat of the protective filter 67 could be supported directly on the wall of the housing 9, which is provided with a perforation 79 in area of the bypass chamber 63, see FIG. 2.

As can be seen from FIGS. 3 and 4, the exemplary embodiment of the filter device shown comprises an entraining device acting between the retaining body 33 and the corresponding end cap 25, allowing for an easy and safe replacement operation of used filter elements 17, 19. At several points distributed around the circumference of the filter element 17, 19, the entrainment device comprises tension members 83, each in the form of an elongated strip 81 (FIG. 4) anchored to the underside of the disk 57 of the retaining body 33. Preferably, three strips 81, distributed around the circumference, are provided, of which only one strip 81 is visible in the rotational position illustrated in FIGS. 3 and 4. The respective strip 81 is slidable in a respective corresponding tab 85, which is mounted on the outer periphery of the end cap 25. A protrusion, not visible in the drawing, is located on the free end of the strip 81. If, in order to replace the filter element 17, 19, the lid 11 is lifted and is removed from the housing 9 via the support bar 35 of the retaining bodies 33 by moving the lid 11 from the retaining body 33, the retaining body 33 first moves away from the filter element 17, 19 with the strip 81 sliding in the tab 85. After a corresponding path length of the separation process, this state being shown in FIG. 3, the protrusion of the bar 81 makes contact with the respective tab 85, which forms a stop for the protrusion, whereby the entrainment device is activated, so that upon further movement, the end cap 25, and then the filter element 17, 19, is moved along and can thus be lifted out of the tank. The strips 81 form, so to speak, a structure for conveniently carrying out replacement operations.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having a removable lid with a retaining body rigidly connected to said lid;
a filter element replaceably accommodated in said filter housing, said filter housing including a filter medium configured to have a fluid to be cleaned flowing through said filter medium;
an end cap on one end of said filter medium of said filter element and positioning said filter element in an operative position in said filter housing, said end cap being connected to said retaining body;
a bypass valve mounted on said retaining body and having an outlet on an outflow side of said bypass valve;
a wall part on said retaining body forming a partition in said filter housing and dividing said filter housing into a filter element chamber and a bypass chamber, said bypass chamber being located on said outflow side of said bypass valve; and
a protective filter in said bypass chamber configured to have fluid flowing out of said bypass flowing through said protective filter by being in fluid communication with and downstream of said outlet of said bypass valve via said bypass chamber.

2. A filter device according to claim 1 wherein
said wall part on said retaining body is in a form of a disk surrounding said bypass valve centrally locates on said disk and extending in a radial plane perpendicular to a longitudinal axis of said filter housing, said filter housing being a hollow cylindrical housing, said protective filter being supported on said disk on a side thereof having said bypass chamber.

3. A filter device according to claim 2 wherein
said retaining body is supported with a peripheral edge thereof on an inside of a wall of said hollow cylindrical housing.

4. A filter device according to claim 3 wherein
an area of said disk adjacent said peripheral edge thereof forms a support for said protective filter.

5. A filter device according to claim 4 wherein
a receiving element is on said area of said disk forming said support for protective filter.

6. A filter device according to claim 5 wherein
said protective filter comprises a filter medium being a hollow cylinder concentric to said longitudinal axis of said filter housing; and
said receiving element comprises an axially projecting annular rib spaced at a radial distance from said peripheral edge of said disk, an outside of said annular rib forming a contact surface engaging an end edge area of said protective filter.

7. A filter device according to claim 6 wherein
an enclosure on an edge of said filter medium of said protective filter radially abuts an outside contact surface of said annular rib.

8. A filter device according to claim 7 wherein
said enclosure is an end cap on said end edge of said filter medium of said protective filter.

9. A filter device according to claim 5 wherein
a support tube supports a filter medium of said protective filter on an outer side of said filter medium of said protective filter, said support tube having fluid passages therein and having an end edge in said receiving element on said disk with a corresponding end edge of said filter medium of said protective filter.

10. A filter device according to claim 1 wherein
an outer side of said protective filter is supported on a wall of said filter housing having fluid passages therein.

* * * * *